(12) United States Patent
Olsen et al.

(10) Patent No.: US 9,171,480 B2
(45) Date of Patent: Oct. 27, 2015

(54) EARLY LEARNING TOOLS AND KITS INCLUDING MANIPULATOR DEVICES FOR ORGANIZED PLAY

(75) Inventors: Janice Z. Olsen, Bethesda, MD (US); Emily F. Knapton, Omaha, NE (US)

(73) Assignee: NO TEARS LEARNING INC., Cabin John, MD (US)

( * ) Notice: Subject to any disclaimer, the term of this patent is extended or adjusted under 35 U.S.C. 154(b) by 34 days.

(21) Appl. No.: 13/245,075

(22) Filed: Sep. 26, 2011

(65) Prior Publication Data

US 2012/0082960 A1 Apr. 5, 2012

Related U.S. Application Data

(60) Provisional application No. 61/386,310, filed on Sep. 24, 2010.

(51) Int. Cl.
*G09B 19/00* (2006.01)
*G09B 19/02* (2006.01)

(52) U.S. Cl.
CPC ............... *G09B 19/00* (2013.01); *G09B 19/02* (2013.01)

(58) Field of Classification Search
USPC .......................................................... 434/98
See application file for complete search history.

(56) References Cited

U.S. PATENT DOCUMENTS

| | | | | |
|---|---|---|---|---|
| 4,478,582 A | * | 10/1984 | Tucker | 434/170 |
| 4,853,994 A | * | 8/1989 | Ekstein | 5/639 |
| 5,533,902 A | * | 7/1996 | Miller | 434/112 |
| 5,897,421 A | * | 4/1999 | Rink et al. | 446/369 |
| 7,211,305 B2 | * | 5/2007 | Steiger et al. | 428/7 |
| 7,461,421 B1 | * | 12/2008 | Faircloth et al. | 5/639 |
| 8,152,587 B1 | * | 4/2012 | Brown | 446/73 |
| 2005/0123885 A1 | * | 6/2005 | Taylor | 434/195 |
| 2006/0177809 A1 | * | 8/2006 | Rich et al. | 434/365 |
| 2008/0176193 A1 | * | 7/2008 | Lucy | 434/129 |
| 2012/0098199 A1 | * | 4/2012 | Scriven | 273/299 |

OTHER PUBLICATIONS

Educational Insightss, "Number Bean Bags", accessed at: http://www.amazon.com/Educational-Insights-Number-Bean-Bags/dp/B000MECK66/ref=sr_1_cc_1?s=aps&ie=UTF8&qid=1365544199&sr=1-1-catcorr&keywords=counting+bean+bags (earliest product review Dec. 2009).*
Manhattan Toy, "Counting and Sorting Farm", accessed at: http://www.amazon.com/Manhattan-Toy-Counting-Sorting-Farm/dp/B00067U1OM%3FSubscriptionId%3DAKIAI6JI3XR2ASXW57DQ%26tag%3Dzgrabxml-20%26linkCode%3Dxm2%26camp%3D2025%26creative%3D165953%26creativeASIN%3DB00067U1OM (earliest product review 2005).*

(Continued)

*Primary Examiner* — Xuan Thai
*Assistant Examiner* — James Hull
(74) *Attorney, Agent, or Firm* — Hogan Lovells LLP

(57) ABSTRACT

Disclosed are manipulator devices for use in learning games, and kits utilizing the same. The manipulator devices may be a substantially elongated and flat body formed of flexible material and at least partially stuffed to resemble a bean bag. The body is adapted to be capable of manipulation between an unfolded position and a folded position, where the folded position conceals an identifiable attribute of the device selected from the group consisting of a number or a symbol. The kits may include three or more manipulator devices each having at least two attributes identifiable by children and allowing them to associate the plurality of devices into subsets according to shared types of these attributes.

15 Claims, 15 Drawing Sheets

| | Red | Yellow | Blue | Orange | Green | Purple |
|---|---|---|---|---|---|---|
| 1 | • Velcro | • Velcro | • Snap | • Hook | • Button | • Loop |
| 2 | •• Velcro | •• Snap | •• Snap | •• Hook | •• Button | •• Loop |
| 3 | •• Velcro • | •• Snap • | •• Hook • | ••• Hook | ••• Button | ••• Loop |
| 4 | •• Velcro •• | •• Snap •• | ••• Hook • | •••• Button • | •••• Button | •••• Loop |
| 5 | •• Velcro •• | •• Snap •• | ••• Hook •• | •••• Button •• | •••• Loop •• | •••• Loop •• |

(56) References Cited

OTHER PUBLICATIONS

Melissa & Doug Deluxe Latches Board, accessed at: http://www.amazon.com/Melissa-Doug-Deluxe-Latches-Board/dp/B000NVBE1A (earliest product review 2007).*

Polonsky, Lydia, "Math for the Very Young: A Handbook of Activities for Parents and Teachers", accessed at: http://www.amazon.com/Math-Very-Young-Handbook-Activities/dp/0471016713/ref=sr_1_2?s=books&ie=UTF8&qid=1365540155&sr=1-2&keywords=teachers+activity+guide+counting (Published 1995).*

Kimbo, "Bean Bag Activities & Coordination Skills", accessed at: http://www.amazon.com/Bean-Bag-Activities-Coordination-Skills/dp/B00000AF6D/ref=pd_sim_t_4 (copyright Apr. 2000).*

Be Amazing Numbers And Counting Eye Spy Bag, accessed at: http://www.amazon.com/Be-Amazing-Numbers-Counting-Eye/dp/B000COF3T2/ref=sr_1_3?s=toys-and-games&ie=UTF8&qid=1365545345&sr=1-3&keywords=bean+bag+counting (earliest product review Apr. 2009).*

Snap Bags, Accessible at: http://stanislaus.networkofcare.org/veterans/assistive/assistive_devices.aspx?pageid=19327&top=32757&ksectionid=0&productid=191218&trail=22,13539&discontinued=0 (product updated Aug. 5, 2009).*

Blanketsbyamy, "Connecting Bean Bag Sets", accessed at: http://web.archive.org/web/20100217024420/http://blanketsbyamy.wordpress.com/connecting-bean-bag-sets/ (Feb. 17, 2010).*

* cited by examiner

|   | Red | Yellow | Blue | Orange | Green | Purple |
|---|---|---|---|---|---|---|
| 1 | • Velcro | • Velcro | • Snap | • Hook | • Button | • Loop |
| 2 | • • Velcro | • • Snap | • • Snap | • • Hook | • • Button | • • Loop |
| 3 | • Velcro • | • Snap • | • Hook • | • • • Hook | • • • Button | • • • Loop |
| 4 | • • Velcro • • | • • Snap • • | • • Hook • • | • • • Button • | • • • Button • | • • • Loop • |
| 5 | • • Velcro • • • • | • • Snap • • • • | • • Hook • • • • | • • • Button • • | • • • Loop • • | • • • Loop • • |

Tag Bags

Tag Bags are a fun math manipulative for developing math, fine motor, and social/emotional skills. Children eagerly open, close, count, sort, classify, measure, toss, and build using the bags. Tag Bags are ideal for both child- and teacher-directed learning.

30 Tag Bags, 30 Color Tags
Take a look at the bags. Open them to discover all of their attributes.

- Colors — Red, yellow, blue, orange, green, purple
- Fasteners — Velcro, snap, hook, button, loop
- Dots on the left — One, two, three, four, five
- Numbers on the right — 1, 2, 3, 4, 5
- Pockets — Hold tags, counters, or slips of paper To get started use the sing-along activities in this booklet. They are arranged in developmental order. Familiar tunes make them appealing and memorable. Enjoy singing with your children, or simply use the words to guide your teaching. When you and your children are familiar with Tag Bags, create your own activities and let the children teach you theirs!

*Look What We're Learning*
This section at the bottom of each activity provides detail about the skills addressed.

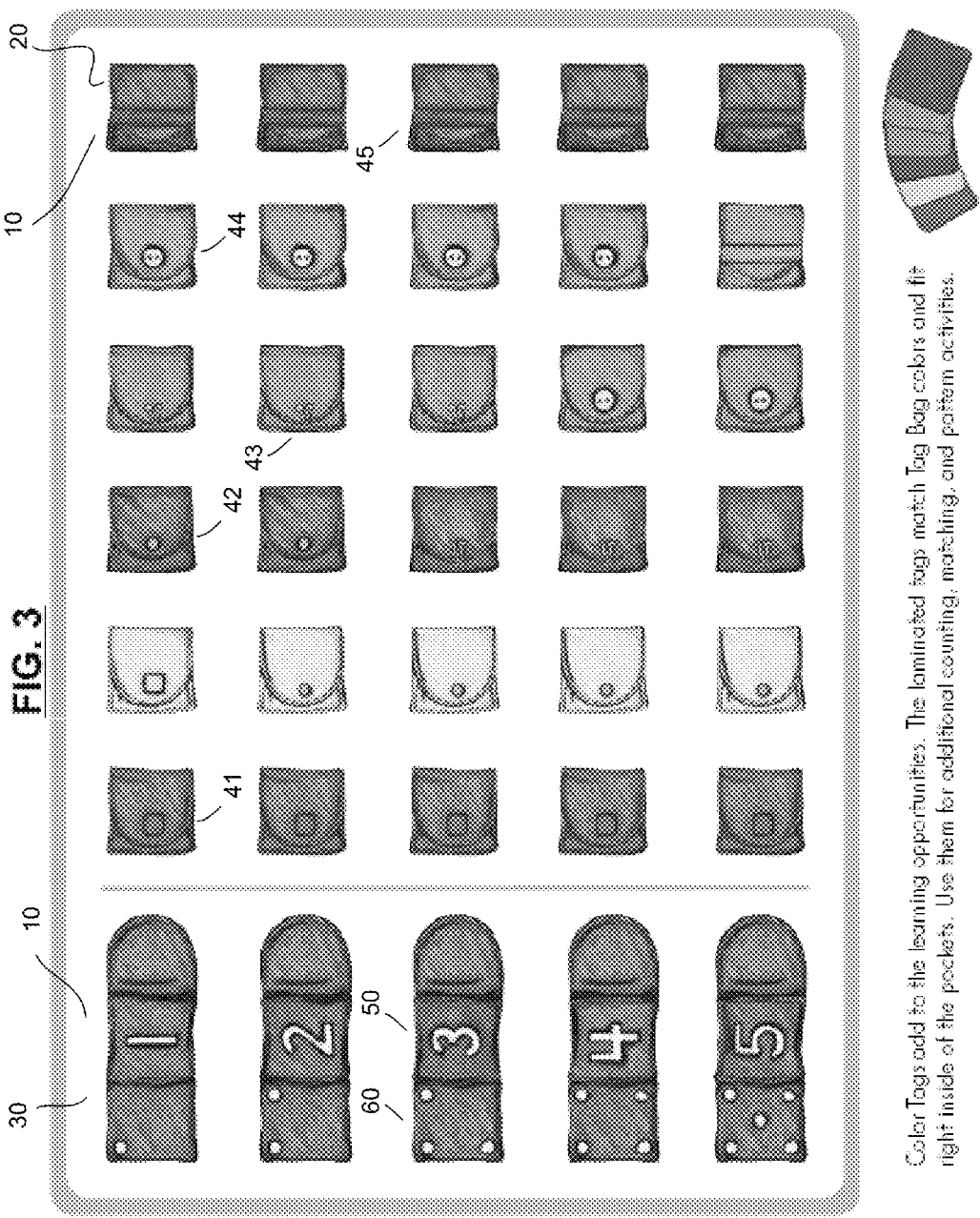

I'm Looking for Red Bags
Tune: "On Top of Old Smokey"

I'm looking for red bags.
Now where can they be?
If you find a red bag,
Please bring it to me.

[Repeat verse with each color]
I'm looking for orange bags . . . .
I'm looking for yellow bags . . . .
I'm looking for green bags . . . .
I'm looking for blue bags . . . .
I'm looking for purple bags . . . .

I'm looking at colors.
Now what do I see?
Six rainbow colors,
Please say them with me.
[spoken] Red, Orange, Yellow, Green, Blue, Purple

Get Started:
Place all Tag Bags in a mixed pile.
Help children arrange bags in a rainbow shape.

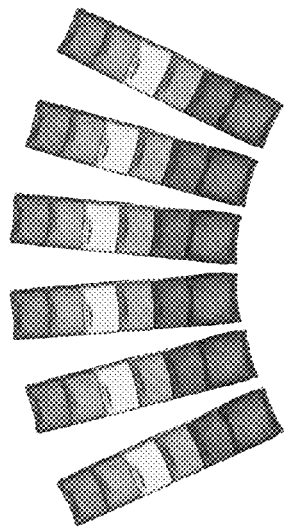

FIG. 4

Look What We're Learning     Patterns/Algebra     Sort and classify by attributes (color)

Point and Count
Tune: "B-I-N-G-O"

We make and count a yellow row.
Let's point and count each bag now.
1, 2, 3, 4, 5
1, 2, 3, 4, 5
1, 2, 3, 4, 5
We have five yellow bags now.

We make and count a longer row,
By adding purple bags on.
First we had five bags.
We count on five more.
6, 7, 8, 9, 10
It's ten bags all together.

[spoken] 1, 2, 3, 4, 5, 6, 7, 8, 9, 10

Get Started:
Help children make a left-to-right row with yellow bags.
Extend with purple bags after first verse.

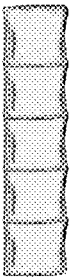
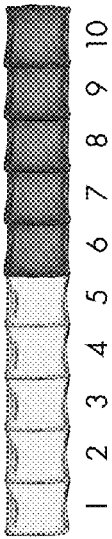

FIG. 6

Look What We're Learning

| | |
|---|---|
| Number | Recognize that the last number counted tells how many (cardinality) |
| Number | Count on from 5 |
| Number | Count to 10 |
| Vocabulary | longer, row, all together |

Look What We're Learning

Get Started:
Find a 3 bag and keep it. Pass out one Tag Bag to each child.

My Bag

Your Bags

 same

 more

 fewer

Count and Compare Dots
Tune: "Jingle Bells"

Open bags. Open bags.
Point and count with me.
My bag has 1-2-3 dots.
How many do you see?

Open bags. Open bags.
Point and count with me.
My bag has 1-2-3 dots.
Who has the same as me?

Open bags. Open bags.
Point and count with me.
My bag has 1-2-3 dots.
Who has more dots than me?

Open bags. Open bags.
Point and count with me.
My bag has 1-2-3 dots.
Who has fewer dots than me?

FIG. 7

| | |
|---|---|
| Fine Motor | Open and close fasteners with two hands (bilateral activity) |
| Number | Count to 5 |
| Number | See that the number is the same as the dot total (1:1 correspondence) |
| Number/Relations | Compare amounts |
| Vocabulary | same, more, fewer |

Get Started:
Place all Tag Bags in a mixed pile. Help children group colors together as they make rows by fastener.

 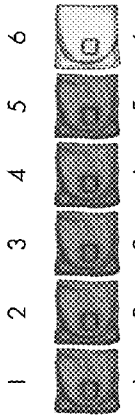 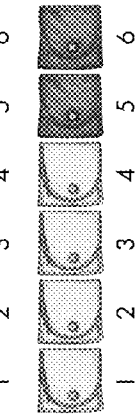 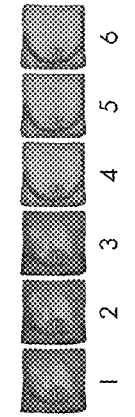 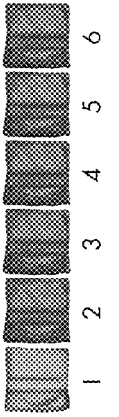

Fastener Sort
*Tune: "Muffin Man"*

Oh, can you find a button bag,
A button bag, a button bag?
Can you find a button bag
And lay it in a row?

What colors are the button bags,
The button bags, the button bags?
What colors are the button bags?
The bags are green and orange.

How many of each color are there,
Each color are there, each color are there?
How many of each color are there?
Let's count the green and orange.
[spoken] 1, 2, 3, 4 green. 1, 2 orange.

We have 4 green and 2 orange,
4 green, 2 orange, 4 green, 2 orange.
We have 4 green and 2 orange,
And that makes 6 in all.
[spoken] 1, 2, 3, 4, 5, 6 in all.

Repeat for each fastener group:  Velcro = 5 red    + 1 yellow
                                  Snap   = 4 yellow + 2 blue
                                  Hook   = 3 blue   + 3 orange
                                  Loop   = 1 green  + 5 purple

FIG. 10

Look What We're Learning

Number             Count to 6
Number/Operations  Put together sets to make a new total (composing)
Patterns/Algebra   Sort and classify by attributes (fastener)
Vocabulary         row, how many, in all

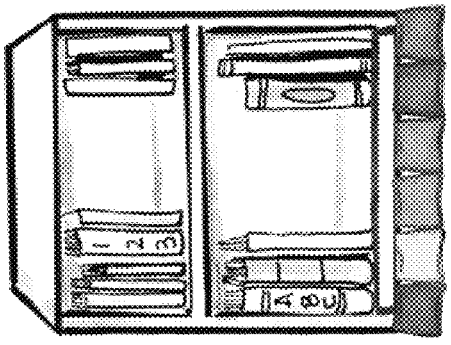

Glossary attributes – characteristics or qualities, such as size, color, shape, weight, texture, number of parts bilateral activity – a task that requires the use of both hands cardinal number – (one, two, three . . .) a word that tells the counted quantity cardinality – answers the question, "How many?", the last number counted tells the total classification – sorting or grouping things into categories based on various criteria composing – putting together sets to make a new total one-to-one correspondence – assigning one number to one object in a set when counting ordinal number – (first, second, third . . .) a word that tells the position of something in a sequence pattern – a sequence of objects or attributes that repeats again and again set – a group of objects that shares one or more attributes sorting – separating objects into groups or sets based on attributes

Instructional Scope

Number is a fundamental way of describing. Number Operations and Relations include quantity, comparing quantities, counting, and mathematical operations.
- Count to 5; Count to 10
- Recognize that the last number counted tells how many (cardinality)
- Count on from 5
- See that the number is the same as the dot total (1:1 correspondence)
- Compare amounts
- Connect number to ordinal name
- Put together sets to make a new total (composing)

Geometry is the study of shapes and space. Spatial Relations are associations between objects and/or people in an environment.
- Place tools for measuring end-to-end

Measurement is determining the size of an object. It connects geometry and number.
- Use non-standard units

Patterns/Algebra are problem solving strategies. Seeing and creating patterns is basic to algebra.
- Sort and classify by attribute (colors or fasteners)
- Create and grow a pattern

Social/Emotional skills are behaviors for relationships with others.
- Wait for a turn
- Cooperate to find names

Fine Motor skill is the coordinated use of hands and eyes.
- Open and close fasteners with two hands (bilateral activity)

Vocabulary is language for naming and describing math concepts, e.g., fewer, length, repeat.

EARLY LEARNING TOOLS AND KITS INCLUDING MANIPULATOR DEVICES FOR ORGANIZED PLAY

CROSS REFERENCE TO RELATED APPLICATIONS

This application claims the benefit of priority of prior U.S. provisional patent application No. 61/386,310 filed Sep. 24, 2010, the entirety of which is herein incorporated by reference.

FIELD OF THE INVENTION

The present invention relates to early learning tools and kits that may be used for organized play, such as by a group of children or similar ages. More particularly, the inventions disclosed herein relate to the use of bags, containers, or other manipulator devices in learning kits where those devices may be handled by children and have certain attributes that can be identified by children and used to associate with or differentiate those devices from other like devices in the kit in prescribed manners to promote learning.

BACKGROUND OF THE INVENTION

Educational research has increasingly identified the importance of early childhood education, and, in particular, pre-kindergarten ("pre-K") education, in facilitating the likelihood that children will get the most out of a conventional primary education. It is important, however, for children to be presented with developmentally-appropriate learning activities. For example, young children learn best by doing, and, in particular, by participating actively in physical and sensory experiences. Their attention spans are short, so lessons must be quick. They think and communicate in a direct fashion and this is what they understand. Thus, lessons likewise should be straightforward. Further, social interaction engages them emotionally and helps them retain their learning. Thus, engaging group activities, often in the form of games, are a way favored by educators to encourage Pre-K children to learn effectively in enjoyable, stress-free ways.

Often times, the "three Ms" of music, math, and movement, are key components in creating this joyful learning atmosphere. Activities communicated in rhyme and/or to music give children experience with an essential literacy skill, while maintaining a math subject focus. Rhymes and songs are predictable, and quickly become familiar and memorable for children and teachers alike.

It has also become apparent that early learning should focus upon developing certain foundation skills that are helpful to condition children for learning more difficult concepts later in life and, in particular, in a common classroom environment. A first such foundation skill is fine motor skills. Physical play and tasks provide children with fine motor challenges that not only build muscle strength and control, but which also are believed to be crucial for developing neurological pathways for future learning. The development of social skills is also a focus of current early learning. Pre-K group learning oftentimes provides a child's first experience in a larger group of children. Therefore, pre-K group learning activities also can serve as a valuable training ground for acceptable and/or desirable group and classroom behavior, such as turn-taking, volume control, cooperation, sharing and manners in general.

Another foundation skill includes the conditioning of children to understand to concept of symbols. Schools rely heavily upon symbols and representation of concepts, while children learn naturally in the real world by direct experience with people, places and things. Early learning can be used to condition children to adapt quickly to a conventional school environment, a world of symbols that includes letters, numbers, reading, writing and arithmetic. Pre-K is successful when it continues active real world learning while easing children into the world of symbols.

Pre-K children are also in a stage of development where they are learning to organize. Pre-K children absorb ideas and skills quickly, but, without understanding how to group and organize, what they know and learn may be random, with little organizational structure. They need opportunities to learn the relationships among things, to sort, categorize, compare, order, and describe, other important foundation skills. They can accomplish these tasks through play situations, structured or unstructured, and engaging teacher-directed activities. By doing this, children make sense of their world.

A great deal of current research also points to the importance of the development of math and spatial skills during early learning. The National Research Council (2009) recommends that early childhood math experiences concentrate on (1) numbers (which includes whole number, operations, and relations) and (2) geometry, spatial relations, and measurements with a greater concentration of time focused on numbers.

The demand for pre-K children to meet learning goals is greater than ever before, and it is one aim of one or more inventions disclosed herein to provide learning kits tools that allow engaging activities that create an atmosphere of discovery, keeping children's attention and allowing them to learn essential concepts without stress.

Further, it is another aim of one or more inventions disclosed herein to provide learning kits and tools that encourage peer interaction and positive teacher/child interaction, helping children to develop critical social/emotional skills such as self-regulation and respect for others.

Additionally, it is an aim of one or more of the inventions disclosed herein to provide learning kits and tools that develop key foundation skills in pre-K children, including fine motor skills and early math skills that will be used in future learning of broader math concepts.

Also, it is an aim of one or more of the inventions disclosed herein to provide learning kits and tools that enable children, singly or in group settings, to engaging in a plurality of different learning activities that utilize manipulator devices that teach the children foundational math concepts, such as counting, grouping, and ordering objects, in enjoyable ways.

Furthermore, it is an aim of one or more of the inventions disclosed herein to provide learning kits and tools that teach and promote the exploration of numbers and developmentally appropriate math concepts in essential math domains, such as geometry, spatial relations, and measurement, with engaging activities while also promoting fine motor skill development and social development.

SUMMARY OF THE INVENTION

To achieve the above-described and other aims, the learning kits according to the present invention include a plurality of devices that are designed to be manually manipulated by a child ("manipulator devices") and an activity booklet explaining a plurality of learning activities designed for children to utilize the manipulator devices and thereby develop skills and/or learn concepts. The activity booklet is targeted toward an adult activity leader (such as a teacher) and describes how to utilize the manipulator devices in each of the learning activities. Preferably the learning activities would be organized in developmental sequence in the activity booklet, allowing the activity leader to build on skills in a prescribed manner by progressing through the book with the children over time.

The manipulator devices each generally are able to be held by a child and be manipulated in some fashion (e.g., opened, folded, changed from one configuration to another, etc.), and each have a plurality of attributes that are identifiable by the children (e.g., a color, a printed number, a texture, a material, a design, a manipulation mechanism, etc.) and which allow the children to group, associate, and/or order certain manipulator devices with others in the kit in the course of the learning activities. For example, one preferred kit may have 25 total manipulator devices that are similar in basic construction, but which vary in some fashion such that each is distinguishable from the other 24. For this kit of 5 devices, for example, five each can be red, five blue, five green, five yellow, and five purple, while the five devices within such a color group each can be identified by a different number (e.g., 1-5). Further, each of the 25 may also have another attribute type (e.g., a symbol) that allows manipulator devices to be ordered and/or associated with other manipulator devices across a variety of attribute types (e.g., three of the red devices have squares and two circles, while the blue devices have one each of a square, a rectangle, a triangle, a circle, and a star). In this manner, for example, during a learning activity children may be asked to collect all the manipulator devices that have a number less than 3 printed on them, to collect all the red manipulator devices that bear a certain symbol, or to place the purple manipulator devices in numerical order.

In preferred embodiments of the invention, the manipulator devices each have at least two attributes, including one of a plurality of colors and one of a plurality of numbers. A number may be represented by a numeral or symbol (e.g., dots like in dice), or, most preferably, both. Even more preferably, the devices each have at least three attributes, including one of a plurality of colors, one of a plurality of numbers, and one of a plurality of manipulation mechanisms. The manipulative mechanism may include, for example, a mechanism for securing a flap or other closure, such as a snap, a button, a hook and loop, a zipper, and the like.

In certain embodiments of the invention, an attribute of one or more of the manipulator devices is only identifiable if the manipulator device is in some way manipulated. For example, if the manipulator device comprises a flap, lid, or other closable or moveable item which has an open and closed position, such flap, lid, or such item could conceal an attribute (e.g., a symbol) in the closed position while exposing it to view only once the child manipulates it into the open position.

In other preferred embodiments of the invention, the manipulator devices have a pocket or other enclosure for holding a card or other item that is configured to be used in certain ones of the learning activities, thus providing another "hidden" attribute to each manipulator device that may be revealed during the course of a particular learning activity and only if the child successfully manipulates the manipulator device in some fashion. For example, the hidden item can be a card that depicts a number, word, picture, or other symbol, or can be a slip of paper upon which the leader has written the name of one of the children in the group.

In most preferred embodiments of the invention, the manipulator devices comprise bean bag-like devices that unfold and have a pocket for holding a card or other item, which devices are hereafter referred to as a "Tag Bag." Each Tag Bag has one of a plurality of different manipulation mechanisms that holds the bean bag device in a closed position, and is adapted such that the child can work the mechanism (e.g., undo a button) to allow the particular bag to unfold into an open position that allows the child to view an attribute (e.g., see a numeral printed on the inside) and/or have access to the pocket.

In the various embodiments of the invention, essential math vocabulary may be featured in songs and rhymes (e.g., comparative language such as "greater" and positional words such as "first") used in certain of the learning activities, with the lyrics to the songs and rhymes being set forth in the activity booklet along with the "tune" to which the song is sung. For example, a song may have math-related lyrics adapted to the tune of a well-known children's song, such as "The People on the Bus." Optionally, the kit may further include an audio cassette or compact disc providing a recording of the songs which may be played during an activity. The various activities may also incorporate movement of many types, such as whole body motions, fine motor manipulation of the manipulator devices, moving the manipulator devices into various positions, and having children physically form groups and/or migrate between groups based upon characteristics of the manipulator devices.

In this regard, a first aspect of the invention includes a manipulator device for use in learning games. The manipulator device includes a substantially elongated and flat body formed of flexible material and at least partially stuffed to resemble a bean bag. The body is adapted to be capable of manipulation between an unfolded position and a folded position, where the folded position conceals an identifiable attribute of the device selected from the group consisting of a number or a symbol.

A second aspect of the invention includes a kit for use in learning activities. The kit includes three or more manipulator devices each having at least two attributes identifiable by children and allowing them to associate the plurality of devices into subsets according to shared types of these attributes. One of the attributes is a manipulator attribute such that each one of the devices may be manipulated from one state to another state, and at least a first one of the devices is adapted to be manipulated in an identifiably different manner from at least a second one of the devices such that the first one can be distinguished from the second one based upon the manipulator attribute.

The various aspects and embodiments of the inventions herein having been thus described and summarize, preferred embodiments thereof will now be described in detail with reference to various drawings.

BRIEF DESCRIPTION OF THE DRAWINGS

FIG. 1 is a table showing how three different attributes can be allocated among plurality of manipulator devices in one preferred embodiment of a learning activity kit of the present invention.

FIG. 2 through FIG. 15 are illustrations of pages 1 through 14, respectively, of a learning activity booklet provided in a kit according to one preferred embodiment of the present invention.

DETAILED DESCRIPTION OF THE PREFERRED EMBODIMENTS

Figure 5:
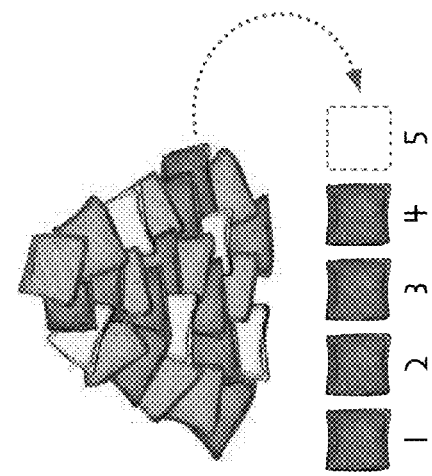
Figure 8:
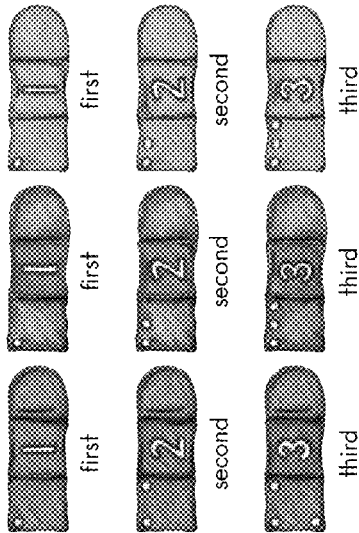
Figure 9:
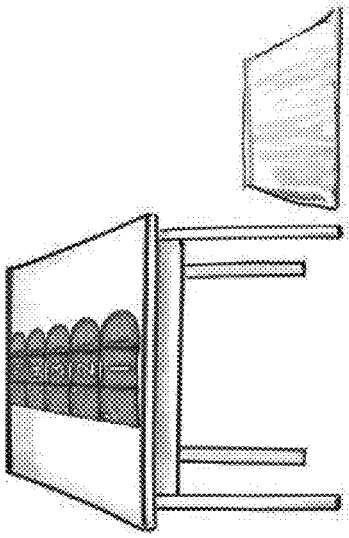
Figure 12:
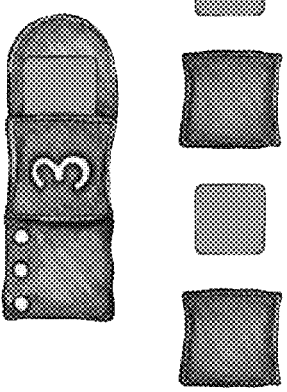

The detailed description provided hereafter, which references the attached drawings, describes one preferred embodiment of the invention which comprises a learning activity kit containing a plurality of Tag Bags, bean bag-like devices that have a folded, substantially square-shaped configuration and an unfolded, substantially rectangular-shaped configuration such that each Tag Bag can unfold to reveal hidden symbols and provide access to an interior pocket for holding a card or other item. The description that follows is not in any way limiting of the claims, but is rather intended to illustrate preferred embodiments of the invention, including the making and using of the same.

As seen depicted in FIG. 3, the Tag Bags 10 operate in similar fashion to a tri-fold wallet whereby its outer edges can be folded inward twice and assume a folded position 20 or unfolded into an open position 30. The learning kits according to this preferred embodiment include approximately twenty or more Tag Bags and an activity booklet explaining a plurality of learning activities designed for children to utilize the Tag Bags to develop skills and/or learn concepts.

The activity booklet is targeted toward an adult activity leader (such as a teacher) and describes how to utilize the manipulator devices in each of the learning activities. It is often preferred in early learning to employ the concept of scaffolded instruction wherein children learn concepts gradually and carefully. Concepts are introduced by teacher modeling before children participate. They participate along with the teacher and other classmates before they are expected to perform tasks independently. The learning sequence will first involve exposure to concepts, next experience with the concepts, before any expectations for independent performance of the tasks. Monitoring of children's progress is critical to ensure concepts and skills are developed correctly. To this end, the activity booklet is preferably designed so as to assist the leader in providing scaffolded instruction, such as by, for example, providing instructions for the leader to introduce the learning activity in a manner that eases the children into the activity and introduces concepts in a sequence that promotes building of desired skills. As such, the learning activities are preferably organized in developmental sequence in the activity booklet, allowing the activity leader to build on skills in a prescribed manner by progressing through the book with the children over time. Each activity (preferably ten or more in a booklet), is designed to be quick (completed in approximately 10-15 minutes), and easy to learn and enjoyable for the targeted age group of children.

One particularly preferred kit comprises the activity booklet, thirty Tag Bags, and thirty color tag cards that are each adapted to fit within a pocket of a Tag Bag. Optionally, an audio cassette or compact disc containing music associated with the activity booklet can be included. In this particular preferred embodiment, each Tag Bag is sized to be easily held by a child, such as having dimensions, when in its folded position, of approximately a 3½ by 3½ inch square having a thickness of approximately 1½ inches. The Tag Bags generally have a right flap and left flap that are designed to fold over a center portion and be secured in place with a fastener. The center portion also has a pocket sized to hold one or more of the color tag cards or some other object.

The covering of these Tag Bags is formed by sewing a soft, yet durable and washable material, such as denim, into a covering having the desired bean bag-like shape and at least partially stuffing it with a suitable material such that the Bag is suitably filled to have substance but still easily movable between a fully folded position 20 and fully open position 30. Each Tag Bag covering is formed primarily from a material having one of the six colors of red, yellow, blue, orange, green, purple such that the Tag Bags can be said to have a color attribute (i.e., subsets of the Tag Bags can be sorted and/or associated according to one of these six colors). Further, each Tag Bag has a fastener to keep it in the folded position, and the fasteners can be one of the five different fastener types of Velcro 41, snap 42, hook 43, button 44, and loop 45 such that the Tag Bags can be said to have a fastener attribute.

These preferred Tag Bags also have a number attribute represented by both an Arabic numeral 50 and a pattern of dots 60 (e.g., like on throwing dice) representing on each Tag Bag one of the numbers "1" through "5." As shown in FIG. 3, the number attribute can be hidden within the inside of each Tag Bag such that it can only be seen once the Tag Bag is unfolded, with the numeral and dot pattern being visible side by side upon unfolding. In this regard, for example a child could see that a Tag Bag is green and has a button fastener, but cannot see that this particular Tag Bag it is the "number 3" green Tag Bag until the button is unfastened and the Tag Bag unfolded. In the example represented in the figures, the dots are on the left flap of each Tag Bag while the numeral is placed in the center of each Tag Bag. Optionally, the dots can be placed in different patterns, such as in corners for primary color bags (red, yellow, blue), but in rows for secondary color bags (orange, green, purple).

FIG. 1 is a table showing how the color attribute, number attribute and fastener attribute can be allocated among thirty Tag Bags in a most preferred embodiment. As depicted, the are five Tag Bags formed from material in each of the six colors (i.e., five blue Tag Bags, five red Tag Bags, etc.), and, within each color group, the Tag Bags contain both dots and numerals for one of the numbers one through five. No numbers are repeated within a given color group. FIG. 1 also shows that all of the red Tag Bags have a Velcro fastener and all of the purple Tag Bags have a loop fastener, but the yellow, blue, orange, and green Tag Bag groups have Tag Bags having different fasteners (e.g., the orange Tag Bags having three with hook fasteners and two with button fasteners). This mixing and matching of different attributes permits the learning activities to teach mathematical concepts such as grouping, subsets, and addition, as will be understood further by one skilled in the art after reviewing the example activity book depicted in FIGS. 2-15.

Figure 13:
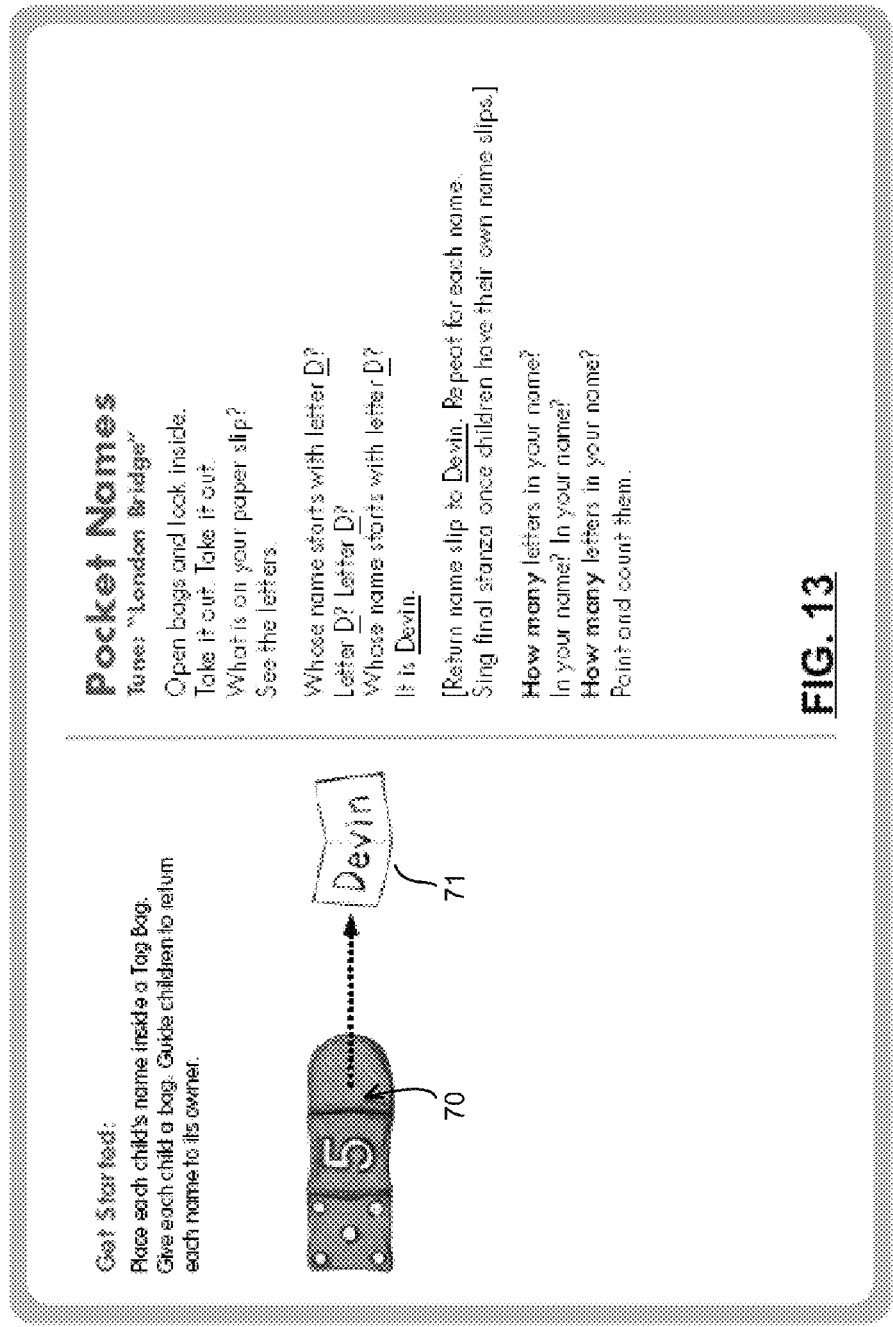

The tags (not depicted) in the kit according to this particularly preferred embodiment are cards that are sized and shaped to fit easily within the pocket 70 (see the paper 71 bearing a child's name being withdrawn from pocket 70 in FIG. 13) of each Tag Bag (i.e., approximately 2½ by 2½ inches square, each, with rounded corners), and formed from heavy, coated card stock. The kit contains thirty different tags such that each Tag Bag can have a tag placed within it. The tags are provided, in this preferred embodiment, in the same six different colors as the Tag Bags, namely, red, yellow, blue, orange, green, purple, (i.e., so they can be matched with like-colored Tag Bags) and has print on at least one side, and most preferably both sides, of the card. This print can be symbols, letters, shapes, words, pictures, etc., that will be used in one or more of the activities.

The activity booklet included in this particularly preferred embodiment of the present invention is depicted in FIG. 2 through FIG. 15. The activity booklet contains a product description (see FIG. 2 and FIG. 3), a glossary (see FIG. 14), a summary of instructional scope (see FIG. 15), and leader instructions for various activities, organized in developmental sequence (see, in order, FIG. 4 through FIG. 13).

The activities (shown each on their own page in the activity booklet per FIG. 4 through FIG. 13) all teach concepts focused in math domains via learning activities that use the Tag Bags (and optionally color tag cards) in easy to learn and enjoyable "games." As can be seen from referencing the various different learning activity instruction pages depicted in FIG. 4 through FIG. 13, the activities generally comprise a rhyme, chant, or song that is first modeled for the children by the leader, and then the children participate when repeated. Each instruction page not only contains instructions for the leader and song or chant lyrics, but also a list of accomplishments such that the leader can easily identify what early learning skills are being taught and/or reinforced.

For example, looking specifically at the page of the activity booklet depicted by FIG. 5, we see the second learning activity in the activity booklet. The activity "Let's Count Blue Bags" starts with all of the Tag Bags (in folded position) placed in a mixed-up pile. While the leader sings the lyrics (sung to the tune of the well-known children's song "Frère Jacques"), he pulls blue colored bags from the pile, lines them up, and then counts them. This action then can be repeated with other colors with the children participating. The bottom of the page shows the accomplishments for the activity, namely that the children will be learning, among other things, counting, sorting and classifying objects by color, and vocabulary.

The preferred embodiments having thus been described, those skilled in the art will readily appreciate that various modifications and variations can be made to the above described preferred embodiments without departing from the spirit and scope of the invention. The invention thus will only be limited to the claims as ultimately granted.

The invention claimed is:

1. A kit for use in performing learning activities, said kit comprising a three or more manipulator devices,
   wherein each manipulator device comprises a singular, non-detachable, substantially elongated and flat body formed of flexible material, wherein said body comprises a first flap, a second flap, a center portion, wherein said first flap and said second flap are foldable in relation to said center portion, wherein said first flap, said second flap, and said center portion are of equal size, and wherein said body is at least partially stuffed to resemble a bean bag, and
   each manipulator device having at least two attributes identifiable by children and allowing said children to associate said plurality of devices into subsets according to shared types of said attributes, and
   wherein one of said attributes is a manipulator attribute such that each one of said devices may be manipulated from one state to any one of four distinct states selected from the group consisting of:
   1) wherein the first and second flap are in the open position;
   2) wherein the first flap is in the open position and the second flap is in the closed position;
   3) wherein the first flap is in the closed position and the second flap is in the open position; and
   4) wherein the first and second flaps are in the closed position;
   wherein the closed position comprises a flap overlapping the center portion in full,
   wherein the open position comprises a flap not overlapping the center portion,
   wherein at least one of said attributes identifiable by children is concealed when the first flap or the second flap is in the closed position,
   wherein said manipulator attribute comprises a fastener for holding said first flap and said second flap in the closed position, and
   wherein at least a first one of said devices is adapted to be manipulated in an identifiably different manner from at least a second one of said devices such that said children can distinguish said first device from said second device based upon said manipulator attribute.

2. The kit of claim 1, wherein at least two of said manipulator devices are adapted to be manipulated in an identifiably similar manner such that said at least two devices can be associated with one another by children according to said manipulator attribute.

3. The kit of claim 1, wherein one of said attributes is a color attribute such that each one of said devices is characterized by one of a plurality of colors, and wherein at least one of said devices is characterized by a first color and at least a second one of said devices is characterized by a second color such that said children can distinguish said first device from said second device based upon said color attribute.

4. The kit of claim 3, wherein at least two of said manipulator devices are characterized by said first color such that said at least two devices can be associated with one another by children according to said color attribute.

5. The kit of claim 1, wherein one of said attributes is a number attribute, such that each one of said devices is characterized by one of a range of numbers, and wherein at least one of said devices is characterized by a first number and at least a second one of said devices is characterized by a second number such that said children can distinguish said first and said second ones upon said number attribute.

6. The kit of claim 5, wherein at least two of said manipulator devices are characterized by said first number such that said at least two devices can be associated with one another by children according to said number attribute.

7. The kit of claim 5, wherein said number attribute comprises a numeral and a number of countable symbols both visible on each said device, and wherein for a particular manipulator device the numeral relates to the number of symbols.

8. The kit of claim 1, further comprising an activity booklet describing a plurality of learning activities that may be performed using at least a portion of said plurality of manipulator devices.

9. The kit of claim 1, wherein said manipulator devices each contain a concealable enclosure for holding an item.

10. The kit of claim 9, further comprising a plurality of cards each sized for placement within said enclosure of a manipulator device, and wherein each said card has at least one card attribute identifiable by children and allowing said children to associate said plurality of cards into subsets according to said attributes.

11. The kit of claim 8, further comprising an audio cassette or compact disc for providing a playable recording of songs associated with the activity booklet and the activities, wherein the songs are played while the activities from the booklet that incorporate the use of the portion of the plurality of the manipulator devices are performed.

12. A kit comprising a plurality of manipulator devices for use in learning games, each of said devices comprising:
   a singular, non-detachable, substantially elongated and flat body formed of flexible material, wherein said body comprises a first flap, a second flap, a center portion, wherein said first flap and said second flap are foldable in relation to said center portion, wherein said first flap, said second flap, and said center portion are of equal size, and wherein said body is at least partially stuffed to resemble a bean bag, said body being adapted to be capable of manipulation between any one of four distinct states selected from the group consisting of:
   1) wherein the first and second flap are in the open position;
   2) wherein the first flap is in the open position and the second flap is in the closed position;
   3) wherein the first flap is in the closed position and the second flap is in the open position; and 4) wherein the first and second flaps are in the closed position, and wherein the closed position comprises a flap overlapping the center portion in full, wherein the open position comprises a flap not overlapping the center portion, wherein when the first flap is in the open position and the second flap is in the closed position; or when the first flap is in the closed position and the second flap is in the open position; or when the first and second flap are in the closed position an identifiable attribute of said device selected from the group consisting of a number or a symbol is concealed; and wherein said manipulator attribute comprises a fastener for holding said first flap and said second flap in the closed position; and an instruction booklet, wherein at least two of said manipulator devices have a same number concealed when the first flap is in the open position and the second flap is in the closed position;

or when the first flap is in the closed position and the second flap is in the open position; or when the first and second flap are in the closed position; and wherein at least two of said manipulator devices are adapted to the manipulated in an identifiably similar manner and wherein at least two of said manipulator devices are adapted to be manipulated in an identifiably different manner such that subsets of said plurality of devices can be formed by association certain devices with one another according to said manner of manipulation.

13. The plurality of manipulator devices according to claim 12, wherein each of said manipulator devices comprise a printed numeral and a pictorial representation of said numeral both affixed to said body, and wherein at least one of said printed numeral or said pictorial representation is concealed when the first flap is in the open position and the second flap is in the closed position; or when the first flap is in the closed position and the second flap is in the open position; or when the first and second flap are in the closed position.

14. The plurality of manipulator devices according to claim 12, wherein each of said manipulator devices comprise a pocket formed in said body for holding an item, said pocket being accessible wherein when either the first or second flap are in the open position.

15. A kit for use in performing learning activities, said kit comprising:
a) an activity book;
b) three or more manipulator devices, wherein each manipulator device comprises a singular, non-detachable, substantially elongated and flat body formed of flexible material, wherein said body comprises a first flap, a second flap, a center portion, wherein said first flap and said second flap are foldable in relation to said center portion, wherein said first flap, said second flap, and said center portion are of equal size, and wherein said body is at least partially stuffed to resemble a bean bag, each manipulator device having at least two attributes identifiable by children and allowing said children to associate said plurality of devices into subsets according to shared types of said attributes, and wherein one of said attributes is a manipulator attribute such that each one of said devices may be manipulated from one state to any one of four distinct states selected from the group consisting of:
1) wherein the first and second flap are in the open position;
2) wherein the first flap is in the open position and the second flap is in the closed position;
3) wherein the first flap is in the closed position and the second flap is in the open position; and
4) wherein the first and second flap are in the closed position, and wherein the closed position comprises a flap overlapping the center portion in full, wherein the open position comprises a flap not overlapping the center portion, wherein at least a first one of said devices is adapted to be manipulated in an identifiably different manner from at least a second one of said devices such that said children can distinguish said first device from said second device based upon said manipulator attribute, each manipulator device having at least two identifiable attributes identifiable by children and allowing said children to associate said plurality of devices into subsets according to shared types of said identifiable attributes, wherein at least one of said attributes identifiable by children is concealed when said first flap or said second flap is in the closed position, wherein at least a first one of said devices is adapted to be manipulated in an identifiably different manner from at least a second one of said devices such that said children can distinguish said first device from said second device based upon said manipulator attribute, and wherein said manipulator attribute comprises a fastener for holding said right flap and said second flap in the closed position, and wherein said fastener of least one of said devices is identifiably different from the fastener on at least a second manipulator device such that said children can distinguish the first fastener from the second fastener, thus rendering the fastener an identifiable attribute, wherein each of said manipulator devices contains a concealable enclosure for holding an item;

wherein the at least two identifiable attributes are different identifiable attributes, wherein the activity book describes a plurality of learning activities that may be performed using at least a portion of said plurality of manipulator devices; and c) a plurality of cards each sized for placement within said enclosure of the manipulator device, and wherein each said card has at least identifiable attribute identifiable by children and allowing said children to associate said plurality of cards into subsets according to said identifiable attributes.

* * * * *